United States Patent
Feng et al.

(10) Patent No.: US 9,982,869 B2
(45) Date of Patent: May 29, 2018

(54) HOUSING OF ELECTRONIC MODULE, ELECTRONIC MODULE, LIGHT EMITTING MODULE AND BACKLIGHT MODULE

(75) Inventors: Yaojun Feng, Shenzhen (CN); Yuanyuan He, Shenzhen (CN); Yubao He, Shenzhen (CN); Yabin Luo, Shenzhen (CN); Canbang Yang, Shenzhen (CN)

(73) Assignee: OSRAM GMBH, Munich (DE)

( * ) Notice: Subject to any disclaimer, the term of this patent is extended or adjusted under 35 U.S.C. 154(b) by 600 days.

(21) Appl. No.: 14/238,212

(22) PCT Filed: Aug. 10, 2012

(86) PCT No.: PCT/EP2012/065728
§ 371 (c)(1),
(2), (4) Date: May 26, 2014

(87) PCT Pub. No.: WO2013/024046
PCT Pub. Date: Feb. 21, 2013

(65) Prior Publication Data
US 2014/0307419 A1    Oct. 16, 2014

(30) Foreign Application Priority Data
Aug. 15, 2011 (CN) .......................... 2011 1 0233866

(51) Int. Cl.
*F21V 15/00* (2015.01)
*F21V 15/01* (2006.01)
(Continued)

(52) U.S. Cl.
CPC ................ *F21V 15/01* (2013.01); *F21S 4/24* (2016.01); *H05K 5/02* (2013.01); *F21Y 2115/10* (2016.08);
(Continued)

(58) Field of Classification Search
CPC .... F21S 4/28; F21S 8/033; F21S 8/036; F21S 8/038; F21V 19/005; F21V 19/0055
See application file for complete search history.

(56) References Cited

U.S. PATENT DOCUMENTS

| 4,925,137 A * | 5/1990 | Hastings | F16M 11/20 |
| | | | 126/30 |
| 6,086,225 A * | 7/2000 | Kahl | F21V 3/00 |
| | | | 313/318.01 |

(Continued)

FOREIGN PATENT DOCUMENTS

| DE | 4441477 A1 | 5/1996 |
| DE | 102007043861 A1 | 4/2009 |

(Continued)

OTHER PUBLICATIONS

English abstract of DE 4441477 A1 of May 23, 1996.
International Search Report issued in the corresponding PCT application No. PCT/EP2012/065728, dated Feb. 1, 2013.

*Primary Examiner* — Sean Gramling
(74) *Attorney, Agent, or Firm* — Viering Jentschura & Partner MBB

(57) ABSTRACT

A housing of an electronic module may include: a mounting surface located at one side of the housing, wherein the mounting surface includes at least three sub-mounting surfaces, lines connecting the centers of respective sub-mounting surfaces form a polygon, and a mounting hole extending from one side of the housing to the other side thereof and being opened within an area of the polygon.

12 Claims, 2 Drawing Sheets

(51) Int. Cl.
*H05K 5/02* (2006.01)
*F21S 4/24* (2016.01)
*G02F 1/1335* (2006.01)
*F21Y 115/10* (2016.01)

(52) U.S. Cl.
CPC .. *G02F 1/133603* (2013.01); *G02F 1/133608* (2013.01)

(56) References Cited

U.S. PATENT DOCUMENTS

| | | | |
|---|---|---|---|
| 6,332,694 B1* | 12/2001 | Chih-Hsiung | G01C 15/002 362/259 |
| 7,114,841 B2 | 10/2006 | Aanegola et al. | |
| 7,687,288 B2 | 3/2010 | Saha et al. | |
| 2005/0231943 A1 | 10/2005 | Sloan et al. | |
| 2005/0286254 A1* | 12/2005 | Richardson | F21S 13/12 362/388 |
| 2009/0262531 A1* | 10/2009 | Saha | G09F 13/0409 362/240 |
| 2011/0085334 A1 | 4/2011 | Wang | |
| 2011/0179683 A1 | 7/2011 | Khan | |
| 2011/0194284 A1 | 8/2011 | Quaal et al. | |
| 2011/0285298 A1 | 11/2011 | Schwalenberg et al. | |

FOREIGN PATENT DOCUMENTS

| | | |
|---|---|---|
| DE | 202009000236 U1 | 7/2010 |
| WO | 2010079089 A2 | 7/2010 |
| WO | 2011090795 A2 | 7/2011 |

* cited by examiner

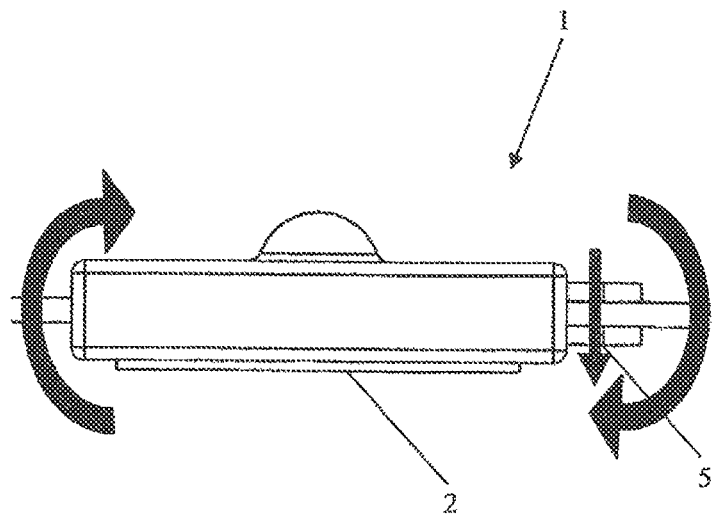
Fig. 1 --Prior Art--
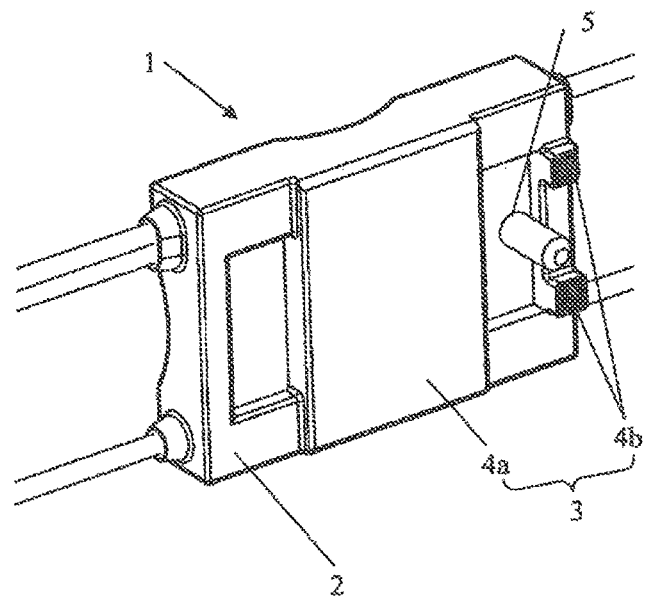
Fig. 2

HOUSING OF ELECTRONIC MODULE, ELECTRONIC MODULE, LIGHT EMITTING MODULE AND BACKLIGHT MODULE

RELATED APPLICATIONS

The present application is a national stage entry according to 35 U.S.C. § 371 of PCT application No.: PCT/EP2012/065728 filed on Aug. 10, 2012, which claims priority from Chinese application No.: 201110233866.3 filed on Aug. 15, 2011, and is incorporated herein by reference in its entirety.

TECHNICAL FIELD

Various embodiments relate to a housing of an electronic module, an electronic module and light emitting module having said housing and backlight module.

BACKGROUND

Nowadays, a backlight chain consisting of light emitting modules, especially LED modules, has been increasingly used in people's daily life. During a manufacturing process, a plurality of electronic light emitting modules need to be combined and fixed to form a suitable shape, which is generally linear. In order to prevent the respective modules from motion and rotation around a wire extending therethrough, the respective modules need to be fixed on corresponding mounting planes. In the prior art, one solution is to use at least two screws to fix one light emitting module, for example, arranging one additional part such as a screw hole on the front and back sides of the housing, respectively, along a direction of the wire extending through the housing in order to receive and fix the screw. Thus, the housing is fixed on a mounting plane via its front and back end parts. The drawbacks of this solution lie in that the operation is cockamamie and needs long time, and the fixing cost is high.

Another method is as shown in FIG. 1. An additional part for receiving a screw such as a mounting hole 5 is opened on one end part of the housing 1. The screw is used to tightly press the housing 1 against the mounting plane. However, in the case of using a fixing member located laterally, there is generated a torque away from the mounting plane, with the fixing member as a center, such that the housing 1 will be tilted or move. Accordingly, an adhesive layer adhered directly to the mounting plane is provided on a bottom surface 2 of the housing 1, such that the tendency that the housing 1 rotates about the fixing member is reduced. Since the adhesive layer ages and the stickiness becomes lower, the reliability of this solution for fixing the module is decreased, making the module tilt. The fixing cost of this solution used is relatively high. Due to the use of the adhesive layer, it is different to remove the module adhered to the mounting plane when re-fixing, causing a waste of adhesive layer.

SUMMARY

Various embodiments provide a novel housing for an electronic module. Such a housing is low in installation cost, easy in operation, and high in mounting reliability and may avoid the drawbacks in the background.

Various embodiments provide a housing of an electronic module, including a mounting surface located at one side of the housing, wherein said mounting surface includes at least three sub-mounting surfaces, lines connecting the centers of respective sub-mounting surfaces form a polygon, and a mounting hole extending from one side of the housing to the other side thereof is opened within an area of the polygon.

The mounting surface of the housing, viz. at least three sub-mounting surfaces, is taken into consideration within the scope of the present disclosure. The arrangement of the positions of these sub-mounting surfaces is preferably planned according to geometrical principles, making lines connecting sequentially the respective sub-mounting surfaces, especially lines connecting their centers, form a polygon. A single fixing member is used to extend through the mounting hole opened in the area of the polygon for the housing to be fixed firmly on the mounting plane. Since the fixing member applying pressure towards the mounting plane to the housing is merely opened in the area of the polygon formed by the sub-mounting surfaces, it can be ensured that the pressure applied by the fixing member to the housing may further act on the respective sub-mounting surfaces, which does not generate a torque away from the mounting plane, with the fixing member as a center, in the case of using a fixing member located laterally in the prior art and prevents the housing from being tilt or moving.

Preferably, the mounting hole is opened in the central area of the polygon.

Preferably, the distance between a plane at a mounting surface side where the mounting hole is located and a light emitting plane of the electronic module is smaller than the distance between the respective sub-mounting surfaces and the light emitting plane of the electronic module, viz. viewed from the mounting side of the module, the respective sub-mounting surfaces is more distant from the light emitting plane of the electronic module as compared with the plane at the mounting surface side where the mounting hole is located.

Thus, the mounting surface goes beyond the plane where the mounting hole is located for the respective mounting surfaces to be in direct contact with the mounting plane.

In various embodiments, the number of the sub-mounting surfaces is three, and lines connecting the centers of the respective sub-mounting surfaces form a triangle. A polygon with the simplest structure is a triangle. Thus, merely using one fixing member in the case of the minimum number of the sub-mounting surfaces can fix the housing on the mounting plane in such a way as to prevent tilting and moving.

In various embodiments, the sub-mounting surfaces include one first sub-mounting surface with a first area and two second sub-mounting surfaces with second areas, the first area is larger than second area. In actual application, the larger the area of the sub-mounting surface is, the higher the mounting stability is realized. Thus, the first sub-mounting surface with a larger area may be, for example, one third of the area of the bottom of the housing or of other suitable size.

In various embodiments, the first sub-mounting surface is a symmetrical design having the same symmetry axis as that of the housing. Preferably, the first sub-mounting surface is opened in a central area of the housing. Thus, the first sub-mounting surface with a larger area is arranged on the center of the housing, providing stability for mounting the housing.

Preferably, the triangle is an isosceles triangle and the first sub-mounting surface is connected with the respective second sub-mounting surfaces to form two equal sides of the isosceles triangle. In such a case as forming the isosceles triangle, the mounting hole is particularly preferably opened on the symmetry axis of said isosceles triangle, which can realize the stable, reliable fixing effect.

In various embodiments, at least a convex-concave structure is formed on the second sub-mounting surfaces. Said convex-concave structure is preferably a plurality of V-shaped recesses or of other shapes, which thus increases the friction between the second sub-mounting surfaces and the mounting plane and improves the stability of the housing.

In various embodiments, the first and second sub-mounting surfaces are level with each other, whereby a pressure towards the mounting plane can be applied to the housing and the sub-mounting surfaces which are at the same time against the mounting plane generally designed as even.

In various embodiments, the housing further includes a double side tape layer adhered on the first sub-mounting surface, whereby the first sub-mounting surface may be further adhered firmly to the mounting plane.

In various embodiments, the mounting hole is a screw hole, whereby a fixing member such as a screw is used to mount the housing on the mounting plane. The mounting hole may be designed according to the profiles of other common fixing members.

Various embodiments further provide an electronic module, a light emitting module including the above housing, and a backlight module including a plurality of light emitting modules connected in serials.

The housing for the electronic module according to the present disclosure is low in installation cost, easy in operation, and high in mounting reliability and avoids the drawbacks in the prior art.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 is a side view of housing of an electronic module having one fixing member in the background art;

FIG. 2 is a 3D view observed from the base of housing for an electronic module according to the present disclosure;

DETAILED DESCRIPTION

Figure 3:
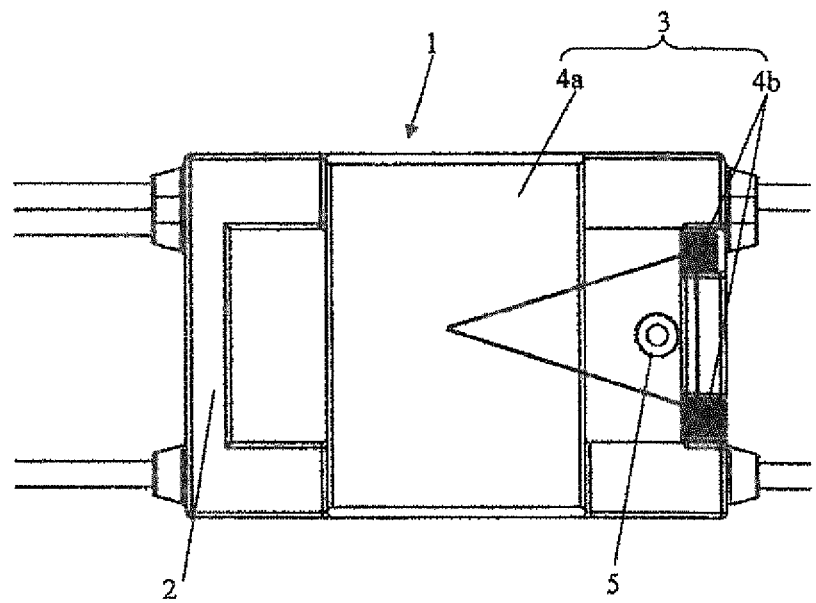
FIG. 3 is a bottom view of housing for an electronic module according to the present disclosure.

The following detailed description refers to the accompanying drawing that show, by way of illustration, specific details and embodiments in which the disclosure may be practiced.

FIG. 2 is a 3D view observed from the base of a housing for an electronic module according to the present disclosure. Two wires extend through the housing 1 at one side, and another wire extends through the housing 1 in parallel therewith at the other side. A mounting hole 5 preset for a fixing member extends through the housing 1 in a direction perpendicular to the wire. A mounting surface 3 facing a mounting plane (not shown) is provided at a side of bottom surface 2 of said housing 1, the mounting surface 3 herein consisting of three sub-mounting surfaces 4a, 4b. In order for the respective sub-mounting surfaces 4a, 4b to be in direct contact with the mounting plane, the distance between a plane at the side of bottom surface 2 where the mounting hole 5 is located and a light emitting plane of the electronic module is smaller than the distance between the respective sub-mounting surfaces 4a, 4b and the light emitting plane of the electronic module, viz. viewed from the mounting side of the module, the respective sub-mounting surfaces 4a, 4b is more distant from the light emitting plane of the electronic module as compared with the plane at the side of sub-mounting surfaces 4a, 4b where the mounting hole 5 is located. That is to say, the respective sub-mounting surfaces 4a, 4b are formed which goes beyond the bottom surface 2. The mounting surface 3 comprises one first sub-mounting surface 4a with a larger area and two second sub-mounting surfaces 4b with smaller areas. In said preferred embodiment, the first sub-mounting surface 4a is a rectangle serving as a central segment of the bottom portion of the housing 1, located on a longitudinal central axis of the housing 1, viz. a central axis in parallel with the wire, and thus has a symmetry axis same as that of the housing 1. The second sub-mounting surfaces 4b are located symmetrically at two sides of the central axis, respectively. A plurality of first and second sub-mounting surfaces 4a, 4b may be considered to be arranged according to specific conditions, making lines connecting the respective sub-mounting surfaces 4a, 4b, especially lines connecting the centers thereof, form a geometrical polygon such as a rectangle, a pentagon, etc. The mounting hole 5 shall be opened within an area of this geometrical polygon, preferably in a central area of the geometrical polygon, which can fix the housing on the mounting plane in such a way as to prevent tilting and moving.

FIG. 3 is a bottom view of the housing 1 for an electronic module according to the present disclosure. From the figure, it can be determined definitely that the distances between two second sub-mounting surfaces 4b and the first sub-mounting surface 4a are equal. Two second sub-mounting surfaces 4b may be preferably formed at a side adjacent to an opening which the wire extends through on the housing 1. Thus, the central points of the two second sub-mounting surfaces 4b and the central point of the first sub-mounting surface 4a may form a shape of isosceles triangle. The mounting hole 5 extends through the housing 1 in the central area between the second sub-mounting surfaces 4b and the first sub-mounting surface 4a. The fixing member such as a screw extends through the mounting hole 5 such as a screw hole and extends from the bottom surface 2, which fixes the housing 1 on the mounting plane.

It can be determined based on geometrical principles that a triangle has high stability. Arranging the mounting hole 5 and the corresponding fixing member thereof between the first sub-mounting surface 4a and the second sub-mounting surfaces 4b, viz. in an interior area of the isosceles triangle constituted by the centers of three surfaces, may prevent advantageously the housing 1 from moving or being tilted when pressed by the fixing member against the mounting plane. Therefore, in a preferred embodiment, merely one single mounting hole 5 and the corresponding fixing member thereof need to be provided on a symmetry axis of the isosceles triangle constituted by the central points of two symmetrical second sub-mounting surfaces 4b and the first sub-mounting surface 4a to achieve more stable, reliable fixing effect.

In order to prevent the housing 1 from moving on the mounting plane under the effect of an external force or possibly rotating due to using the fixing member to press tightly the housing 1 against the mounting plane, at least one, preferably a plurality of convex-concave structures, is provided on the respective second sub-mounting surfaces 4b. Said convex-concave structure may be a V-shaped recess or of other shapes, thereby increasing the friction between the second sub-mounting surfaces 4b and the mounting plane and improving the stability of the housing 1. On the first sub-mounting surface 4a there may be preferably provided an adhesive layer such as a double side tape, which further adheres firmly the first sub-mounting surface 4a to the mounting plane.

Figure 4:
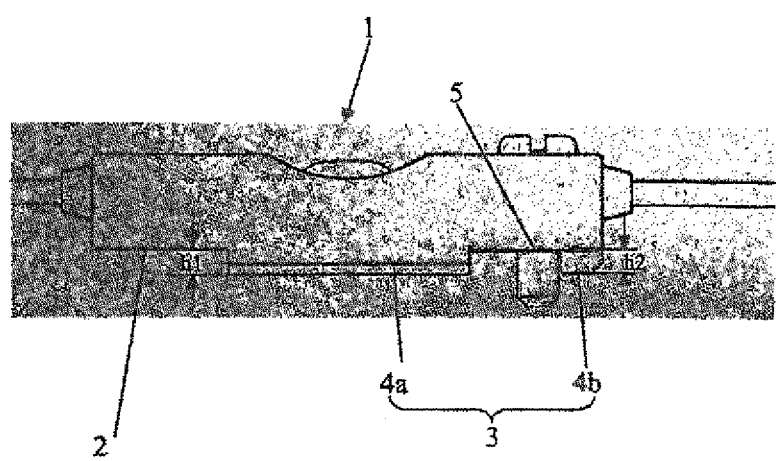
FIG. 4 is a side view of housing for an electronic module according to the present disclosure.

FIG. 4 is a side view of the housing 1 for an electronic module according to the present disclosure. From the side view, it can be seen clearly that a height h1 by which the first sub-mounting surface 4a projects from the bottom surface 2 of the housing 1 towards the mounting plane is equal to a height h2 by which the second sub-mounting surfaces 4b extend from the first lateral surface of the housing 1 towards the mounting plane, which realizes that the first sub-mounting surface 4a is level with the second sub-mounting surfaces 4b. The fixing member located between the first sub-mounting surface 4a and the second sub-mounting surfaces 4b extends through the mounting hole 5 and projects from the bottom surface 2 and beyond the plane where the first sub-mounting surface 4a and the second sub-mounting surfaces 4b are located so as to extend through the mounting plane and to fix the housing 1 thereon. When using the fixing member to press the housing 1 against the mounting plane, the first sub-mounting surface 4a and the second sub-mounting surfaces 4b may be against the mounting plane at the same time, and the pressure applied by the fixing member to the whole housing 1 may be further applied to the first sub-mounting surface 4a and the second sub-mounting surfaces 4b. According to actual conditions, the areas of first sub-mounting surface 4a and the second sub-mounting surfaces 4b and the positions of the fixing member on the respective sub-mounting surfaces 4a, 4b may be adjusted reasonably so as to achieve the optimum stable fixing effect.

In addition, the housing 1 according to the present disclosure may be used as housings of an electronic module provided with an electronic assembly and a light emitting module provided with a light emitting assembly. Such a plurality of light emitting modules connected in series may constitute a backlight module, wherein the backlight module comprises a backlight source such as an LED, a circuit board, and other electronic components.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS 1 housing
2 bottom surface
3 mounting surface
4a first sub-mounting surface
4b second sub-mounting surface
5 mounting hole

The invention claimed is:

1. A housing of an electronic module, comprising:
   a mounting surface located at one side of the housing, wherein the mounting surface comprises at least three sub-mounting surfaces, wherein the sub-mounting surfaces comprise one first sub-mounting surface with a first area and two second sub-mounting surfaces with second areas, wherein the first sub-mounting surface is located in a central area of the housing, and wherein the first area is larger than the second areas, and lines connecting the centers of respective sub-mounting surfaces form a polygon, and
   an entire mounting hole extending from one side of the housing to the other side thereof and being opened within an area of the polygon for a fixing member configured to fix the housing;
   wherein the entire mounting hole is opened in the central area of the polygon.

2. The housing according to claim 1, wherein the distance between a plane at a mounting surface side where the mounting hole is located and a light emitting plane of the electronic module is smaller than the distance between the respective sub-mounting surfaces and the light emitting plane of the electronic module.

3. The housing according to claim 1, wherein the number of the sub-mounting surfaces is three, and the lines connecting the centers of the respective sub-mounting surfaces form a triangle.

4. The housing according to claim 1, wherein the first sub-mounting surface is a symmetrical design having the same symmetry axis as that of the housing.

5. The housing according to claim 3, wherein the triangle is an isosceles triangle and the first sub-mounting surface is connected with the respective second sub-mounting surfaces to form two equal sides of the isosceles triangle.

6. The housing according to claim 1, wherein at least a convex-concave structure is formed on the second sub-mounting surfaces.

7. The housing according to claim 1, wherein the first and second sub-mounting surfaces are level with each other.

8. The housing according to claim 1, wherein the housing further comprises a double side tape layer adhered on the first sub-mounting surface.

9. The housing according to claim 1, wherein the mounting hole is a screw hole.

10. The housing according to claim 1, wherein the fixing member includes a screw.

11. A light emitting module, comprising an electronic module, comprising a housing,
   the housing comprising a mounting surface located at one side of the housing, wherein the mounting surface comprises at least three sub-mounting surfaces, wherein the sub-mounting surfaces comprise one first sub-mounting surface with a first area and two second sub-mounting surfaces with second areas, wherein the first sub-mounting surface is located in a central area of the housing, and wherein the first area is larger than the second areas, and lines connecting the centers of respective sub-mounting surfaces form a polygon, and
   an entire mounting hole extending from one side of the housing to the other side thereof and being opened within an area of the polygon for a fixing member configured to fix the housing;
   wherein the entire mounting hole is opened in the central area of the polygon.

12. A backlight module, comprising a plurality of light emitting modules connected in serials, the light emitting module comprising an electronic module,
   the electronic module comprising a housing,
   the housing comprising a mounting surface located at one side of the housing, wherein the mounting surface comprises at least three sub-mounting surfaces, wherein the sub-mounting surfaces comprise one first sub-mounting surface with a first area and two second sub-mounting surfaces with second areas, wherein the first sub-mounting surface is located in a central area of the housing, and wherein the first area is larger than the second areas, and lines connecting the centers of respective sub-mounting surfaces form a polygon, and an entire mounting hole extending from one side of the housing to the other side thereof and being opened within an area of the polygon for a fixing member configured to fix the housing;

wherein the entire mounting hole is opened in the central area of the polygon.

\* \* \* \* \*